Figure 1:
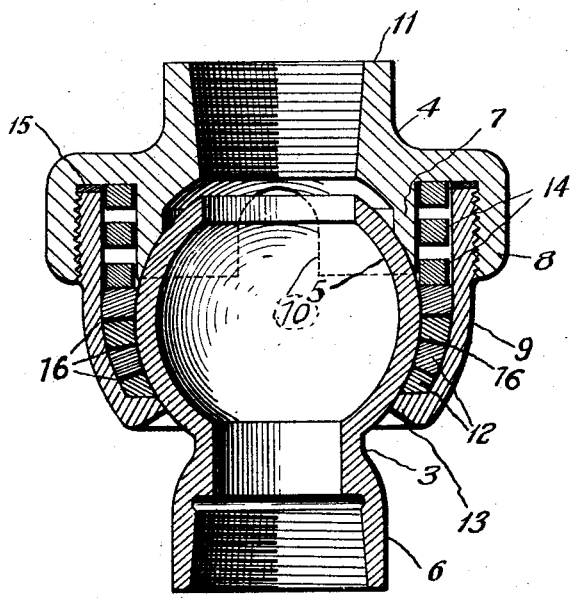

June 23, 1925.

F. VENTON

FLEXIBLE PIPE JOINT

Filed Dec. 8, 1922

1,543,348

Witness:
Harry H. Hitzeman

Inventor
Frederick Venton
By Chas. J. Wilson
Atty.

Patented June 23, 1925.

1,543,348

UNITED STATES PATENT OFFICE.

FREDERICK VENTON, OF CHICAGO, ILLINOIS.

FLEXIBLE PIPE JOINT.

Application filed December 8, 1922. Serial No. 605,603.

*To all whom it may concern:*

Be it known that I, FREDERICK VENTON, a citizen of the United States, residing at Chicago, in the county of Cook and State of Illinois, have invented certain new and useful Improvements in Flexible Pipe Joints, of which the following is a specification.

This invention relates to improvements in flexible pipe joints, such as are used in large numbers on the steam and air train pipe lines. The invention, however, is capable of a wide variety of uses, and is in no sense restricted to the uses mentioned.

The primary purpose of my invention is to provide a flexible joint which will be leakproof, irrespective of the angle to which the joint may be turned, and also irrespective of the pressure carried in the line with which my invention is used.

To accomplish this result, my invention is so designed that the fluid pressure escaping around the ball section of the joint will act upon the packing to compress the same around the ball member, so that the greater the pressure upon the packing becomes, the tighter the packing will be compressed against the ball section to effectually prevent leakage from the joint.

Another object of the invention is to provide a joint which will not be liable to stick or freeze so as to become immovable; and furthermore, my invention is so constructed that wear of the packing is automatically taken up and compensated for, so as to insure at all times a tight joint without the necessity of manual adjustment or manipulation and one which will be durable and long lived in use.

Other objects and advantages of the invention should be readily appreciated as the same becomes better understood by reference to the following description, when considered in connection with the accompanying drawings.

Figure 2:
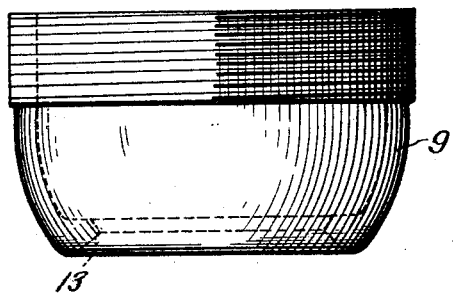

Referring to the drawings:

Fig. 1 is a central longitudinal sectional view of a flexible joint embodying my invention; and Fig. 2 is a detail side elevation of the tapered sleeve element which forms a part of the socket section.

By reference to the drawings more in detail, it will be observed that the joint comprises primarily a ball section and a socket section, designated generally by reference characters 3 and 4, respectively. The ball section comprises a hollow ball portion 5, terminating in an internally threaded nipple 6, adapted to be connected to a pipe.

The socket section comprises a body portion provided with an internal annular wall 7, the inner edge of which is preferably curved to conform to the curvature of the ball portion 5, and an external flange or wall 8 interiorly threaded to receive the threaded upper end of a tapered sleeve 9. The nipple 11 of the socket section is also threaded for connection to a pipe.

It will be observed that the sleeve portion 9 of the socket section is tapered inwardly toward its lower end to provide within this sleeve and around the ball portion 5 a downwardly tapering chamber, adapted to accommodate the packing 12, which, while it may be of any preferred construction, is illustrated as comprising a series of superposed packing rings, made of any suitable composition or other material and preferably made in a continuous strip which is wound spirally around the ball within the sleeve portion 9. The lower edge of the sleeve 9 is inwardly turned to form a flange 13, which is disposed substantially normal to the opposed face of the ball portion 5, and fits relatively snugly thereto and forms the bottom wall for the tapered packing containing chamber just described. The ball has a bearing fit between the flange 13 and the inner end of the wall 7 and is held in position by and between this flange and wall.

While the chamber between the sleeve and the ball is referred to as tapered, this refers only to the perimeter of the chamber and since the inward curvature of the sleeve downwardly from a point approximately in the plane of the transverse axis of the ball, is on an arc substantially concentric with the curvature of the ball, the chamber while decreasing downwardly in diameter is substantially of uniform width or thickness. In other words, while the sleeve 9 slopes downwardly in substantial accordance with the slope of the lower portion of the ball, below its transverse axis, yet the space between the sleeve and the ball below the transverse axis is of substantial width or thickness. The packing is therefore of substantially uniform thickness and cannot become wedged between the chamber walls under pressure so as to bring the wear on a small surface which would quickly wear out and become useless.

The packing 12 is continuously and yieldingly forced downwardly in its tapered containing chamber by a coiled expansion spring 14 interposed between the upper ring of the packing and the body portion of the socket section between the wall 7 and the sleeve 9. The packing is thereby continually urged downwardly in the chamber into snug and leak-tight fitting relation with the ball portion 5, and as the packing becomes worn by repeated movements of the joint, the wear is automatically distributed and taken up and the packing is maintained in snug fitting relation by the expansive action of this spring, in conjunction with the tapered surrounding wall of the sleeve 9. Leakage around the upper end of the sleeve 9 is precluded by a gasket ring 15 interposed between the upper end of the sleeve and the opposed face of the socket member.

It will be observed that the diameter of the nipple 6 is slightly less than the diameter of the opening within the sleeve flange 13, so that in assembling the joint the nipple is inserted downwardly through the lower end of the sleeve 9, which at that time is unconnected with the body of the socket section. The packing 12 is then inserted between the ball portion and the surrounding sleeve. The spring 14 is disposed above the packing, whereupon the sleeve 9 is screwed tightly into the body of the socket section into the position shown in Fig. 1.

The tapered shape of the packing chamber insures a snug fit between the packing, which is continually forced downwardly in the chamber by a superposed spring, and the opposed wall of the ball portion 5. The fluid under pressure within the joint flows outwardly through the ports 10, four of which are formed in the wall 7, and enters the gasket chamber above the packing, with the result that this pressure is exerted upon the top of the packing and forces the packing more snugly into its tapered chamber to prevent leakage around the packing. Since there is no counter-pressure exerted upon the lower face of the packing, it is manifest that the compression of the packing around the ball member will be in proportion to the pressure exerted upon its upper face; consequently, the higher the pressure of the fluid, the greater will be the compression of the packing and its resistance to leakage. The ports 10, formed by cutting away portions of the wall 7, reduce the area of the contact between the lower edge of this wall and the ball 5, thereby reducing the frictional resistance to flexing movements of the joint. The friction is further reduced and movements of the joint are facilitated by interposing between the packing rings a quantity of suitable lubricant 16, such as graphite or a graphite compound, which under pressure is forced against the periphery of the ball 5 to lubricate the same and keep it smooth and also against the enclosing wall 9 so that adjusting and compensating movements of the packing are facilitated. This lubricant also assists in precluding leakage from the joint.

It should be understood that the details of construction shown and described are illustrative merely, and that the principles of my invention may be embodied in structures differing materially from that shown, without exceeding the scope of the invention, as defined in the following claims.

I claim:

1. A flexible pipe joint comprising a ball section, a socket section including a body provided with an inner annular wall opposed to the ball, and a tapered sleeve detachably connected with the body and forming in conjunction with the ball an exteriorly tapered packing containing chamber of substantially uniform width surrounding the ball, said sleeve having at its outer end a flange between which and said annular wall the ball is loosely clamped, packing in said chamber, and means for yieldingly urging said packing toward the flanged end of said chamber.

2. A flexible pipe joint, comprising a ball section, a socket section including a body provided with an inwardly projecting annular wall engaging said ball and a tapered sleeve provided with an inturned flange engaging said ball, said sleeve being detachably connected to said body so that the ball is rotatably held by and between said flange and said wall, packing disposed in the chamber formed by said sleeve around said ball, and a spring in said chamber interposed between said body and said packing whereby said packing is forced toward said flange the packing containing portion of said chamber between the sleeve and ball being of substantially uniform width.

3. A flexible pipe joint comprising a ball section, a socket section embracing the ball section and having a portion thereof concentric with the ball section but spaced therefrom to provide a chamber of uniform thickness but of decreasing diameter said socket section having an inturned flange engaging the ball, and packing disposed in said chamber and supported by the inner portion of the inturned flange.

4. A flexible pipe joint comprising a ball section, a socket section including a body and a sleeve detachably connected thereto, said sleeve being inwardly tapered throughout a portion of its length on an arc concentric with the curvature of the ball, said sleeve having an inturned flange engaging the ball, and packing disposed in the curved space between the ball and sleeve and supported by the inner portion of the inturned flange.

5. A flexible pipe joint comprising a ball section, a socket section including a body and a detachable sleeve concentric throughout a portion of its length with and spaced from the ball to provide an exteriorly tapered chamber of substantially uniform thickness said sleeve having an inturned flange for engaging the ball, and packing in said chamber.

6. A flexible pipe joint comprising a ball section, a socket section forming around a portion of the ball a chamber of substantially uniform width but of gradually decreasing diameter, packing disposed in said chamber, means for supporting the packing and spring means for engaging the upper portion of the packing to yieldably urge it downwardly against its support.

7. A flexible pipe joint comprising a ball portion and socket section forming around a portion of the ball, a chamber of substantially uniform width but of gradually decreasing diameter, a series of superimposed packing rings disposed within said chamber and of substantially a corresponding width and diameter of the chamber, said sleeve having an inturned portion for supporting the packing rings and yieldable means for urging the packing rings downwardly toward the support, substantially as described.

FREDERICK VENTON.